(12) United States Patent
Motos et al.

(10) Patent No.: US 9,928,199 B2
(45) Date of Patent: Mar. 27, 2018

(54) LOW POWER SOFTWARE DEFINED RADIO (SDR)

(71) Applicant: TEXAS INSTRUMENTS INCORPORATED, Dallas, TX (US)

(72) Inventors: Tomas Motos, Oslo (NO); Eivind Syvertsen, Oslo (NO); Marius Moe, Fetsund (NO)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 800 days.

(21) Appl. No.: 14/242,404

(22) Filed: Apr. 1, 2014

(65) Prior Publication Data
US 2015/0278140 A1    Oct. 1, 2015

(51) Int. Cl.
*G06F 13/00*   (2006.01)
*G06F 13/40*   (2006.01)

(52) U.S. Cl.
CPC ...... *G06F 13/4022* (2013.01); *Y02B 60/1228* (2013.01); *Y02B 60/1235* (2013.01)

(58) Field of Classification Search
CPC .................................................. G06F 13/4022
USPC ........................................................ 710/313
See application file for complete search history.

(56) References Cited

U.S. PATENT DOCUMENTS

| 7,058,750 | B1 | 6/2006 | Rankin et al. |
| 7,856,611 | B2 * | 12/2010 | Pisek .................. G06F 17/5045 716/117 |
| 2005/0102437 | A1 | 5/2005 | Pettey et al. |
| 2005/0216700 | A1 * | 9/2005 | Honary ............ G06F 15/17393 712/15 |
| 2006/0015674 | A1 | 1/2006 | Murotake |
| 2006/0199550 | A1 | 9/2006 | Ishikawa et al. |
| 2008/0240090 | A1 | 10/2008 | Heller et al. |
| 2012/0249888 | A1 | 10/2012 | Naik et al. |

\* cited by examiner

*Primary Examiner* — Chun Kuan Lee
(74) *Attorney, Agent, or Firm* — Ronald O. Neerings; Charles A. Brill; Frank D. Cimino

(57) ABSTRACT

A communication apparatus comprising a plurality of signal processing units configured to perform a set of pre-determined signal processing functions according to a set of parameters, a plurality of programmable crossbars coupled to the plurality of signal processing units, and a plurality of control processors coupled to the plurality of programmable crossbars and configured to adjust the plurality of programmable crossbars to interconnect the signal processing units to implement a selected communication protocol, wherein at least one of the programmable crossbars routes data from a first of the plurality of signal processing units to a second of the plurality of signal processing units forming a data path without interception from the plurality of control processors.

22 Claims, 3 Drawing Sheets

LOW POWER SOFTWARE DEFINED RADIO (SDR)

CROSS-REFERENCE TO RELATED APPLICATION

None.

BACKGROUND

A software defined radio (SDR) is a radio communication device that may be defined based on software to wirelessly transmit and receive signals in the radio frequency (RF) part of a spectrum to facilitate transfer of information. An SDR may define a collection of hardware and/or software technologies (e.g. wireless communication protocols) where some or all of the radio's operations and/or components (e.g. physical layer signal processing) may be implemented through modifiable software instead of hardwired implementations. A radio's operations and/or components may include mixers, filters, modulators, demodulators, and detectors, etc. An SDR may employ a single hardware platform to realize multi-mode (e.g. communication protocols and/or modes), multi-band (e.g. radio frequencies), and/or multi-functional (e.g. signal processing algorithms) wireless communication devices via software reconfiguration.

SUMMARY

A low power SDR is disclosed herein. In one embodiment, a communication apparatus includes a plurality of signal processing units, a plurality of programmable crossbars, and a plurality of control processors. The signal processing units are configured to perform a set of pre-determined signal processing functions according to a set of parameters. The programmable crossbars are coupled to the signal processing units. The control processors are coupled to the programmable crossbars and configured to adjust the programmable crossbars to interconnect the signal processing units to implement a selected communication protocol, wherein at least one of the programmable crossbars routes data from a first of the signal processing units to a second of the signal processing units forming a data path without being received by the control processors.

In another embodiment, a method for implementing an SDR includes selecting a plurality of signal processing units for implementing a first communication protocol, wherein each signal processing unit is configured to perform a pre-determined signal processing function according to a set of parameters. The method further includes configuring, via a control path, the parameters for the signal processing units and the programmable crossbars to interconnect the selected signal processing units to implement the first communication protocol. The method further includes receiving, via a data path, an input data stream at a first of the selected signal processing units, processing the input data stream at the first signal processing unit according to a corresponding pre-determined signal processing function, and routing an output data from the first signal processing unit to a second of the selected signal processing units according to the configured programmable crossbars, wherein the control path and the data path are separated.

In yet another embodiment, a communication apparatus capable of supporting multiple wireless communication protocols includes a digital sample interface and a plurality of signal processing clusters. The digital sample interface is coupled to a front end configured to receive and transmit radio signals wirelessly for communication. Each of the signal processing clusters is configured to perform a different set of pre-determined signal processing functions. Each signal processing cluster includes a plurality of signal processing units, a plurality of first programmable crossbars, and a PSM. Each signal processing unit is configured to perform one of the pre-determined signal processing functions. The plurality of first programmable crossbars is configured to selectively interconnect the plurality of signal processing unit, where the data path is separate from the control path. The PSM is coupled to the signal processing units and the programmable crossbars via the control path, wherein the PSM is configured to switch the interconnection of the first programmable crossbars to implement a first of the wireless communication protocol. The communication apparatus further comprises a plurality of second programmable crossbars configured to selectively interconnect the plurality of signal processing clusters to implement the first wireless communication protocol, wherein at least one of the second programmable crossbars is configured to couple to the digital sample interface.

BRIEF DESCRIPTION OF THE DRAWINGS

For a detailed description of exemplary embodiments of the invention, reference will now be made to the accompanying drawings in which.

DETAILED DESCRIPTION

Figure 1:
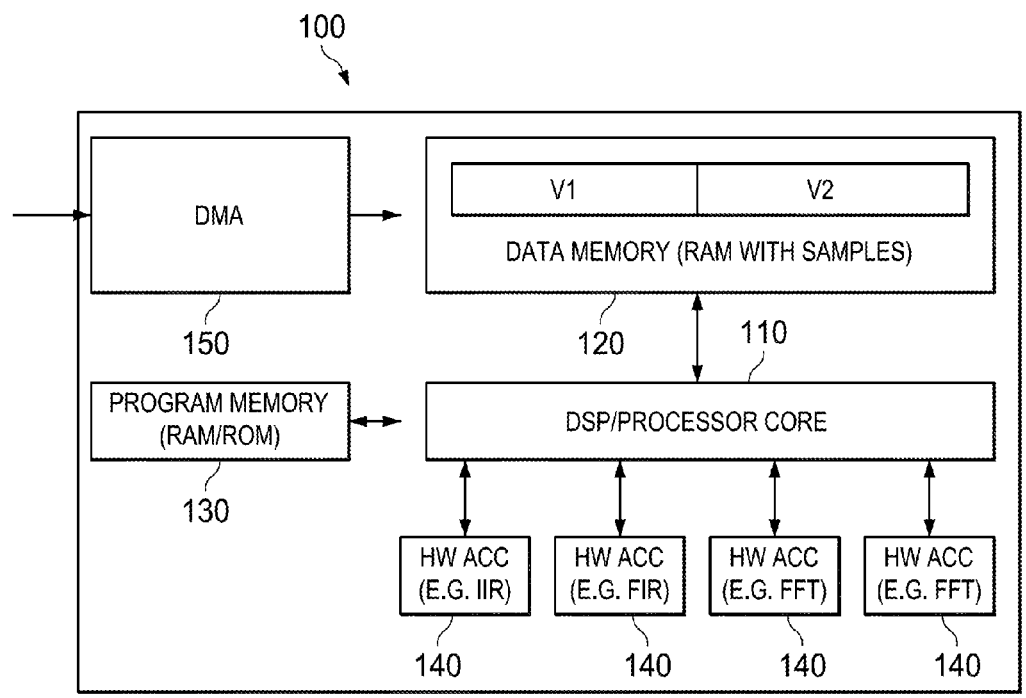
FIG. 1 shows a block diagram of an SDR in accordance with various embodiments.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

There is a growing demand for wireless communication (e.g. data, voice, video, and/or broadcast messaging) through various types of mobile devices in today's interconnected world. As such, wireless communication protocols and/or technologies may continue to evolve and advance. Different wireless communication protocols may employ different information encoding and decoding schemes, different modulation and demodulation techniques, and/or transmit and receive signals in different frequency bands. SDRs may provide a flexible and cost effective solution to adapt to the evolving changes in wireless communication by employing a single hardware platform whose operation is configurable by software. Some SDR architectures may employ a software-driven design paradigm. In such architectures, an SDR may comprise one or more programmable digital signal processing (DSP) cores, memory, and/or some hardware accelerators. While a software-driven SDR design may provide a programmable hardware platform with high flexibility (e.g. fully programmable DSP core with an extended instruction set to include DSP mathematical operations) and high performance (e.g. clocking DSP cores at an increasingly high speed and/or adding some hardware accelerators), the design may not focus on low power consumption. As wireless communication technologies evolve and the number of wireless communication devices and/or applications continues to grow, some wireless communication protocols (e.g. Bluetooth Low Energy (BLE), low power sensor network) may focus on lower power consumption.

Embodiments of the low power SDR disclosed herein include a plurality of actuators, sensors, programmable crossbars, and programmable state machines (PSMs) driven by modifiable software. The actuators may be configured to perform a signal transformation on an input data stream according to some rules and parameters. The sensors may be configured to extract information from an input data stream according to some rules and parameters. The PSMs may configure the programmable crossbars to selectively interconnect the actuators and the sensors to implement various wireless communication protocols. In an embodiment, the actuators, the sensors, and the programmable crossbars may form a data path and the PSMs may control and configure the actuators, the sensors, and the programmable crossbars via a separate control path. The separation of the data path and the control path may allow the high rate data (e.g. analog-to-digital-converter (ADC) samples, modulated symbols, data bits) in a wireless communication device to be processed, exchanged, and/or routed along the data path without being received by the PSMs. By eliminating high rate operations from the PSMs and distributing the controls among the PSMs, each PSM may be clocked at a significantly lower clock rate (e.g. tens of megahertz (MHz)) when compared to an SDR with a DSP core (e.g. hundreds of megahertz (MHz) to gigahertz (GHz)). As such, the lower clock rates and reduction in data accesses and/or movements may reduce energy and power consumption significantly. In some embodiments, the actuators and sensors may be pre-configured to perform a specific signal processing function and may provide flexibility via configurable parameters. For example, an actuator may be configured to perform a Fast Fourier Transform (FFT) and one of the configurable parameters may be the size of the FFT. In another example, a sensor may be configured to compute average signal energy and one of the configurable parameters may be the averaging period. In some embodiments, the disclosed SDR may selectively group actuators, sensors, programmable crossbars, and PSMs into multiple processing clusters based on functional properties and/or signal processing stages (e.g. samples processing, symbols processing, and/or bits processing) to further minimize data transfers and provide an efficient architecture. Thus, the disclosed SDR may provide a low power and efficient SDR with minimum flexibility tradeoff.

FIG. 1 shows a block diagram of an SDR 100 in accordance with various embodiments. SDR 100 may comprise a DSP core 110, a data memory 120, a program memory 130, a plurality of hardware accelerators (HW ACC) 140, and a direct memory access (DMA) unit 150. The DSP core 110 may be any processor core that may be programmed to perform digital signal processing functions and may be coupled to the data memory 120, the program memory 130, and the hardware accelerators 140. The DSP core 110 may provide an instruction set suitable for DSP algorithm implementations (e.g. multiply-and-add, complex multiply and/or add, etc.). The data memory 120 may be any memory storage (e.g. random access memory (RAM)) configured to store data for reading and/or writing. The program memory 130 may be any memory storage (e.g. RAM and/or read only memory (ROM)) configured to store program instructions, which may be executed by the DSP core 110. The hardware accelerators 140 may be any dedicated hardware processing units configured to perform pre-determined signal processing functions (e.g. FFT, finite impulse response (FIR) filter, infinite impulse response (IIR) filter) that are computationally intensive. The DMA unit 150 may be any controller configured to transfer data directly between the data memory 120 and one or more devices and/or sub-systems that are connected to the SDR 100, where the transfer may be independent of the DSP core 110. In some embodiments of SDR 100, data memory 120 and program memory 130 may be positioned external to SDR 100. In such embodiment, SDR 100 may comprise a data memory interface and a program memory interface instead, where the data memory interface may be coupled to external data memory and the program memory interface may be coupled to external program memory.

The architecture of SDR 100 may be a processor-centric architecture, where the DSP core 110 may be the heart of the SDR 100 and multiple wireless communication protocols may be supported by loading different instructions into the program memory 130. For example, SDR 100 may be configured to act as a Long Term Evolution (LTE)) device, a Bluetooth device, or an Institute of Electrical and Electronics Engineers (IEEE) 802.11 wireless local area network (Wifi) access point, by downloading a corresponding software or firmware into the program memory 130. Wireless communication protocols may employ substantially similar DSP algorithms and/or techniques (e.g. FIR, FFT, Forward Error Coding (FEC)), which may be computationally intensive, but relatively fixed. Thus, hardware accelerators 140 may be configured to perform various dedicated DSP algorithms and/or techniques and allow DSP core 110 to focus on other algorithms that are less mature or more likely to change.

In some embodiments, SDR 100 may be coupled to an analog front end (AFE), which may be configured to transmit and receive radio signals for wireless communication. The AFE may comprise one or more ADCs and/or digital-to-analog converters (DACs), where the ADCs may be configured to convert received analog signals into digital ADC samples and the DACs may be configured to convert digital signals into analog signals for transmission. The DMA unit 150 may be coupled to the ADCs and/or the DACs and may be configured to transfer ADC samples from the ADCs into the data memory 120 and/or transfer digital samples from the data memory 120 to the DACs. The DSP core 110 may have control and access to the entire data memory 120 and may be responsible for distributing the samples and/or intermediate data around the hardware accelerators 140. As data rate increases (e.g. megabits per second (Mbps) to gigabits per second (Gbps)), a large amount of samples and data may be written to and/or read from the data memory 120 at an increasingly high rate (e.g. over one million ADC samples may be transferred per second), thus the DSP core 110 may consume a significant amount of energy for accessing and moving data in addition to executing DSP algorithms.

Figure 2:
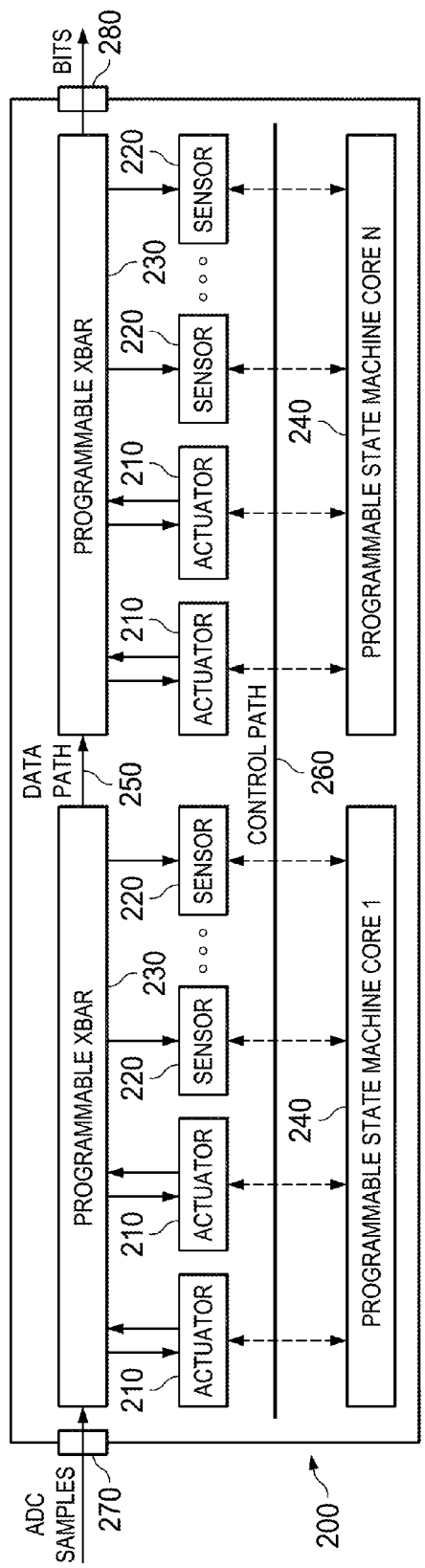
FIG. 2 shows a block diagram of a low power SDR in accordance with various embodiments.

FIG. 2 shows a block diagram of a low power SDR 200 in accordance with various embodiments. SDR 200 may comprise a plurality of actuators 210, a plurality of sensors 220, a plurality of programmable crossbars 230, and one or more PSMs 240. SDR 200 may be configured to implement a complete wireless communication protocol at a physical layer (e.g. layer 1 (L1)) and may support multiple wireless communication protocols via software reconfigurations. SDR 200 may further comprise a digital sample interface 270 at the front end and a data bit interface 280 at the back end. The digital sample interface 270 may be coupled to an AFE, which may receive and transmit radio signals for wireless communication. The AFE may comprise one or more ADCs, which may sample the received analog signals at the ADCs' sampling rate and convert the analog signals into one or more sequences of digital samples, which may be processed by SDR 200. In addition, the AFE may comprise one or more DACs, which may convert the digital samples generated by SDR 200 into analog signals suitable for radio transmission. The data bit interface 280 may be coupled to a sub-system (e.g. higher layer, such as layer 2 (L2) and above), which may process data bits received from SDR 200 and/or generate data bits for SDR 200 to transmit.

The actuators 210 may be any signal processing unit configured to transform an input data stream according to a rule. For example, an actuator 210 may be configured to perform the following:

$$y = f(x, a, b, \ldots) \quad (1)$$

where x is the input data stream received at the actuator 210, $f$ is the processing function defined according to a pre-determined rule, a and b are configurable parameters that the processing function $f$ may operate on, and y is the output data stream produced by the actuator 210. In SDR 200, processing function $f$ may implement a signal processing function and/or a DSP algorithm for a wireless communication protocol. For example, the processing function $f$ may be an FFT, the parameter a may be the FFT size, and the parameter b may be the FFT mode (e.g. complex FFT or real FFT). In another example, the function $f$ may be an FIR filter and the parameter a may be the filter coefficients, and the parameter b may be the filter length. Each of the actuators 210 in SDR 200 may be configured to perform a pre-determined function $f$ according to some configurable parameters a, b, etc. and the function $f$ may differ from one actuator 210 to another actuator 210.

The sensors 220 may be any signal processing unit configured to sink an input data stream and produce a scalar output. For example, a sensor 220 may be configured to perform the following:

$$k = f(x, a, b, \ldots) \quad (2)$$

where x is the input data stream received at the sensor 220, $f$ is a processing function defined according to a pre-determined rule, a and b are configurable parameters that the processing function $f$ may operate on, and k is the scalar output produced by the sensor 220. In SDR 200, processing function $f$ may implement a signal processing function that extracts information from the input the data stream for a wireless communication protocol. For example, the processing function $f$ may be an average signal energy computation and the parameter a may be an averaging period (e.g. the number of samples). In another example, the processing function $f$ may be a maximum function or a minimum function and the parameter a may be period for collecting data (e.g. the number of samples). Each of the sensors 220 in SDR 200 may be configured to perform a pre-determined function $f$ according to some configurable parameters a, b, etc. and the function $f$ may differ from one sensor 220 to another sensor 220. It should be noted that the function $f$ in equation (2) may be different than the function $f$ in equation (1).

The programmable crossbars 230 may be coupled to the actuators 210 and the sensors 220. The programmable crossbars 230 may be any logic array of control and/or signal wires and/or switches that may be configured to produce a specific data flow (e.g. route a set of inputs to a set of outputs according to a set of rules). For example, the programmable crossbars 230 may be configured to interconnect a selective set of actuators 210 and/or sensors 220 to implement a selected wireless communication protocol.

The PSMs 240 may be coupled to the actuators 210, the sensors 220, and the programmable crossbars 230. The PSMs 240 may be any programmable state machine and/or control oriented processor with a simple instruction set (e.g. as opposed to complex instructions) that may be configured to perform a set of control operations. For example, PSMs 240 may be simple reduced instruction set computing (RISC) control machines. The control operations may include configuring the actuators 210 and/or the sensors 220, collecting information and/or events from the actuators 210 and/or the sensors 220, making decisions based on the collected information and/or events, and/or adjusting the programmable crossbars 230 interconnections to implement one or more selected DSP algorithms for a specific wireless communication protocol. In some embodiments, each PSM 240 may be configured to run one task at any one time and may modify the task at a different point of time (e.g. finite state machine (FSM) morphing).

SDR 200 may comprise a data path 250 and a separate control path 260. The data path 250 may be constructed from a first set of physical elements (e.g. actuators 210, sensors 220, programmable crossbars 230, and other logics) that together provide a conduit for the flow and transformation of data, while the control path 260 may be constructed from a second set of physical elements (e.g. PSMs 240 and other control logics) that together coordinate the interactions and behavior of the data path 250. The first set of physical elements and the second set of physical elements may be different and may be configured to operate independently. In addition, the first set of physical elements and the second set of elements may operate in different clock domains. In an embodiment, the first set of physical elements may operate in a high speed clock domain (e.g. GHz) while the second set of physical elements may operate in a low speed clock domain (e.g. MHz), The data path 250 may carry data along the programmable crossbars 230 interconnecting the actuators 210 and the sensors 220. The data path 250 may extend between the digital sample interface 270 and the data bit interface 280. For example, ADC samples may be received at the digital sample interface 270, some selected actuators 210 and/or sensors 220 may perform demodulation and/or data decoding to convert the received samples into data bits, and sending the data bits to the data bit interface 280. Conversely, a data bit stream may be received at the data bit interface 280, some selected actuators 210 and/or sensors 220 may perform data encoding and/or modulation to convert the data bits into digital samples, and sending the digital samples to the digital sample interface 270.

The control path 260 may carry control signals between the PSMs 240, the actuators 210, the sensors 220, and the programmable crossbars 230. Since the data path 250 and the control path 260 are separated, once the PSMs 240 configured the actuators 210, sensors 220, and/or programmable crossbars 230, data may be processed, exchanged, and/or routed without being received by the PSMs 240. During the operation of SDR 200 (e.g. receive and/or transmit), the PSMs 240 may monitor data via the sensors 220, wait for some events from the actuators 210 and/or sensors 220, and/or perform other control operations, which may all be operated at a relatively low rate. As such, PSMs 240 may be clocked at substantially lower clock rates (e.g. about ten to about fifty MHz) than an SDR (e.g. SDR 100) with a DSP-core, thus lowering power consumption significantly. It should be noted that PSMs 240 may operate in short bursts (e.g. performing control operations in response to events) interleaved with event wait periods, where the clock rate (e.g. processing speed) of the PSMs 240 may be determined based on real-time constraints for completing the short burst operations to meet SDR 200 real-time system performance.

In some embodiments, PSMs 240 may be configured with one or more low power modes or sleep modes, for example, through clock gating to disable or lower some switching activities of unused logics and/or gates for a period of time, and thus may further reduce power consumption. For example, a PSM 240 may be configured to be in a sleep mode or a low power mode while waiting for events (e.g. idling with no execution). Upon an event trigger, the PSM 240 may wake up from a sleep state (e.g. wake on interrupt) and perform some control operations in response to the event. After completing the control operations, the PSM 240 may be configured to be in the sleep mode again until the next event trigger. As such, PSMs 240 may enter low power state or sleep state during every event wait period. However, response time from wake up may be governed by real time constraints of the SDR 200, and thus PSMs 240 may be configured with substantially short event response time (e.g. about one to about four clock cycles).

In some embodiments, the actuators 210, the sensors 220, and the programmable crossbars 230 may be configured to perform physical layer signal processing functions in a wireless communication system, which may include a digital transmit signal processing chain and/or a digital receive signal processing chain. In an embodiment, a transmit signal processing chain may begin with randomizing data information bits according to a randomization function before transmission. After data randomization, the randomized data bits may be interleaved according to an interleaving function. After data interleaving, the interleaved data bits may be encoded according to a coding rule (e.g. convolution code). After data encoding, the encoded data bits may be modulated (e.g. mapping the data bits to symbols) onto one or more carrier signals according to a modulation scheme (e.g. Quadrature Phase Shift Keying (QPSK), 16-Quadrature Amplitude Modulation (16-QAM)). The modulated signal may be shaped (e.g. filtering) according to spectral requirements (e.g. bandwidth, out of band transmission, etc.) defined by a wireless communication protocol.

Conversely, a receive signal processing chain may perform the inverse of a transmit signal processing chain. In an embodiment, a receive signal processing chain may begin with conditioning a received signal (e.g. filtering, gain adjustment, sample timing adjustment, carrier adjustment, decimation, upsampling, etc.). Packet detection may be performed to detect the beginning of a packet such that data may be received correctly. After determining the start of a packet, the received signal may be demodulated (e.g. channel estimation, equalization, slicer) into data symbols according to a modulation scheme. After demodulation, the data symbols may be converted into data bits. After converting the data symbols into the data bits, the data bits may be decoded according to a coding rule. After data decoding, the decoded data bits may be de-interleaved according to an interleaving function. After data de-interleaving, the original transmitted data information bits may be recovered by descrambling the de-interleaved data bits according to a randomization function.

As described herein above, the operations in a transmit signal processing chain and/or a receive signal processing chain may be performed sequentially (e.g. from one stage to another stage) and each operation may comprise distinct functional properties. Some wireless communication protocols may employ different coding rules, different randomization function, different interleaving function, different modulation schemes, and/or may utilize a different spectrum, etc., but the stage by stage operations may remain with substantially similar properties. As such, the actuators 210, the sensors 220, and the programmable crossbars 230 for a transmit signal processing chain or a receive signal processing chain may be arranged physically in a substantially similar order to enable more efficient routing of data (e.g. routing data from an actuator 210 or a sensor 220 to a neighboring actuator 210 or sensor 220). It should be noted that some wireless communication protocols may or may not include all transmit and receive signal processing functions described herein above and/or may or may not perform the signal processing functions in the same order. In addition, some wireless communication protocols may require additional processing, such as FFT, inverse Fast Fourier Transform (IFFT), pilot processing, and/or insertion of other physical signals for synchronization purpose. However, the actuators 210 and sensors 220 in SDR 200 may be alternatively configured to incorporate the differences depending on the set of wireless communication protocols that SDR 200 may support.

Figure 3:
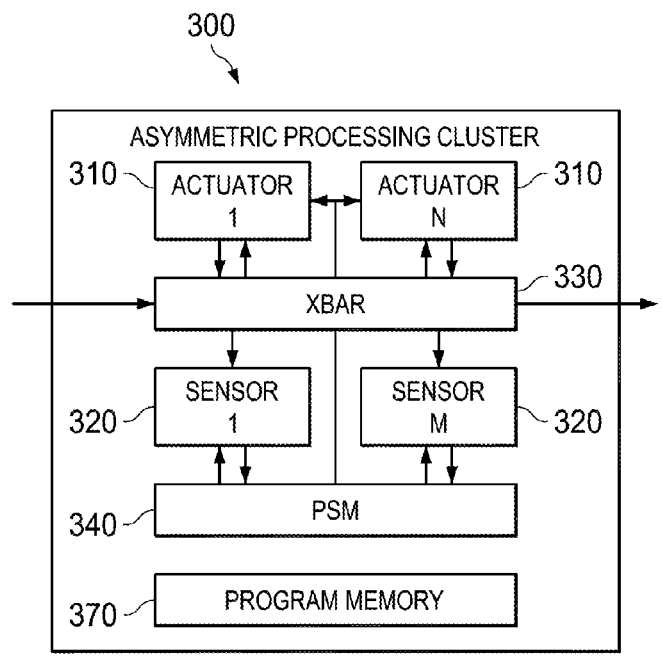
FIG. 3 shows a block diagram of an asymmetric processing cluster in accordance with various embodiments.

FIG. 3 shows a block diagram of an asymmetric processing cluster 300 in accordance with various embodiments. Processing cluster 300 may comprise a plurality of actuators 310 (e.g. ACT 1, . . . , ACT N), a plurality of sensors 320 (e.g. SENS 1, . . . , SENS M), one or more programmable crossbars (XBAR) 330, and a PSM 340, which may be substantially similar to actuators 210, sensors 220, programmable crossbars 230, and PSMs 240, respectively. The processing cluster 300 may further comprise a small program memory 370 (e.g. less than two thousand words), which may be any memory storage (e.g. ROM) configured to store program instructions. The program instructions may be modified (e.g. via download) for different wireless communication protocols and may be executed by the PSM 340 to perform a set of control operations corresponding to a selected wireless communication protocol. The control operations may include configuring parameters for the actuators 310 and the sensors 320 and configuring the programmable crossbars 330 to interconnect the actuators 310 and the sensors 320 to implement a set of pre-determined signal processing functions (e.g. with substantially similar functional properties). The next three embodiments are intended to describe various examples of cluster configurations that may be employed in a receive signal processing chain for wireless communication, but the cluster configuration may be alternatively configured and/or partitioned (e.g. more operational granularity or less operational granularity) as determined by a person of ordinary skill in the art to achieve the same functionalities.

In a first embodiment, processing cluster 300 may be configured to perform sample processing, which may be a first processing stage in a receive signal processing chain. The processing cluster 300 may be configured to receive ADC samples from an AFE at the programmable crossbars 330, one or more of the actuators 310 may be configured to perform filtering operations (e.g. downsampling filter, upsampling filter, interpolation filter, adjacent channel filter, etc.) according to the operating frequency bands of a wireless communication protocol and/or according to the configuration of the AFE. In addition, one or more of the actuators 310 and/or the sensors 320 may be configured to condition the received signals depending on the configuration of the AFE. The programmable crossbars 330 may be configured to route data from one actuator 310 or sensor 320 to a next actuator 310 or sensor 320 that follows in the signal processing chain. It should be noted that the set of sample processing functions may be substantially similar across some wireless communication protocols, but may be processed with different parameters (e.g. filter coefficients, etc.). In addition, some of the actuators 310 and/or sensors 320 may be enabled or disabled and some of the programmable crossbars may or may not be reconfigured for data routing depending on the selected wireless communication protocol.

In a second embodiment, processing cluster 300 may be configured to perform symbol processing, which may be a second processing stage in a receive signal processing chain. In this embodiment, one or more of the actuators 310 and/or the sensors 320 may be configured to perform demodulation (e.g. channel equalization, symbol slicer, etc.) and the programmable crossbars 330 may be configured to route data from one actuator 310 or sensor 320 to a next actuator 310 or sensor 320 that follows in the signal processing chain. It should be noted that the set of symbol processing functions may be substantially similar across some wireless communication protocols, but may be processed with different parameters (e.g. modulation scheme, etc.). In addition, some of the actuators 310 and/or the sensors 320 may be enabled or disabled and some of the programmable crossbars may or may not be reconfigured for data routing depending on the wireless communication protocol.

In a third embodiment, processing cluster 300 may be configured to perform bit processing, which may be a third processing stage in a receive signal processing chain. In this embodiment, one or more of the actuators 310 and/or the sensors 320 may be configured to recover the original transmitted information bits. Bit processing functions may include forward error correction (e.g. Viterbi decoding, Reed Solomon (RS) decoding) and/or any other bit processing (e.g. de-interleaving, descrambling, etc.). The programmable crossbars 330 may be configured to route data from one actuator 310 or sensor 320 to a next actuator 310 or sensor 320 that follows in the signal processing chain. The set of bit processing functions may be substantially similar across some wireless communication protocols, but may be processed with different parameters (e.g. Viterbi constraint length and generator polynomial, de-interleaving parameters, descrambling polynomial, etc.). In addition, some of the actuators 310 and/or sensors 320 may be enabled or disabled and some of the programmable crossbars may or may not be reconfigured for data routing depending on the wireless communication protocol.

By observing the sequential characteristic of signal processing functions in a wireless communication signal chain, a locality principle may be employed to physically position the actuators 310, the sensors 320, and the programmable crossbars 330 within the processing cluster 300 next to each other. In addition, actuators 310 and/or sensors 320 may be physically arranged to take advantage of the sequential characteristic and the programmable crossbars may be configured to route data among a selected set of actuators 310 and/or sensors 320. The localization may enable data to be routed efficiently between neighboring actuators 310 and/or sensors 320 and may simplify the design of the programmable crossbars 330, thus providing a more efficient architecture. A second characteristic of the signal processing functions in a wireless communication signal chain may be the distinct stage by stage processing, such as the sample processing, followed by the symbol processing, and then followed by the bit processing. In some embodiments, processing within a stage may be inter-related. As such, a designated PSM 340 may be employed to control the actuators 310, the sensors 320, and/or the programmable crossbars 330 to implement a set of pre-determined signal processing functions. It should be noted that a wireless communication transmit signal processing chain may be configured and partitioned in a substantially similar mechanism as the receive signal processing chain described herein above, but may perform bit encoding, modulation, and/or spectral shaping instead.

Figure 4:
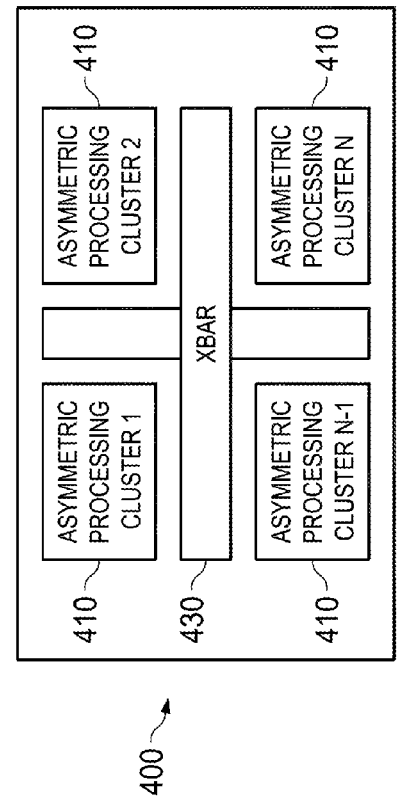
FIG. 4 shows a block diagram of a low power SDR comprising a plurality of asymmetric processing clusters in accordance with various embodiments.

FIG. 4 shows a block diagram of a low power SDR 400 comprising a plurality of asymmetric processing clusters 410 in accordance with various embodiments. In SDR 400, each processing cluster 410 may be substantially similar to processing cluster 300, but each processing cluster 410 may comprise specific signal processing units (e.g. actuators 310, sensors 320) configured for a specific set of signal processing functions that are different from another processing cluster 410. The term asymmetric may refer to the non-replicative nature of the processing clusters 410 in SDR 400. SDR 400 may further comprise programmable crossbars 430 interconnecting the plurality of processing clusters 410, where the programmable crossbars 430 may be substantially similar to programmable crossbars 230 and/or 330. All the local controls and configurations within a processing cluster 410 may be self-contained and may be controlled by a corresponding local PSM (e.g. PSM 340). The PSM may adjust the controls and configurations according to a selected wireless communication protocol. The PSM may be executing instructions stored in a program memory (e.g. program memory 370). As such, different wireless communication protocols may be realized by downloading different instructions to the program memory.

SDR 400 may implement a complete wireless communication protocol by interconnecting the processing clusters 410 via the programmable crossbars 430. In an embodiment, a transmit signal processing chain may be implemented by configuring a processing cluster 410 to perform bit processing functions (e.g. randomization, interleaving, convolutional encoding, etc.), followed by a processing cluster 410 configured to perform symbol processing functions (e.g. modulation), and followed by another processing cluster 410 configured to perform sample processing functions (e.g. filtering for spectral shaping).

In an embodiment, a receive signal processing chain may be implemented by configuring a processing cluster 410 to perform sample processing functions (e.g. filtering ADC samples received from an AFE), followed by a processing cluster 410 configured to perform symbol process functions (e.g. demodulation), followed by another processing cluster 410 configured to perform bit processing functions (e.g. Viterbi, de-interleaving, descrambling). In addition, the receive signal processing chain may further employ one or more processing clusters 410 configured to perform signal detection (e.g. packet synchronization) and/or other control (e.g. automatic gain control, sample timing adjustments, etc.).

In some embodiments, SDR 400 may further comprise a central PSM (e.g. PSM 340) configured to manage, control, and/or coordinate interactions between the processing clusters 410, such as configuring the programmable crossbars 430 to interconnect the processing clusters 410 and/or any other control in SDR 400. In some embodiments, SDR 400 may or may not comprise separate program memory for each processing cluster 410. In some other embodiments, SDR 400 may also comprise some small data memory for the control operations performed at the PSMs. It should be noted that the processing clusters 410 may be alternatively arranged, partitioned, and/or configured as determined by a person of ordinary skill in the art to achieve the same functionalities.

Figure 5:
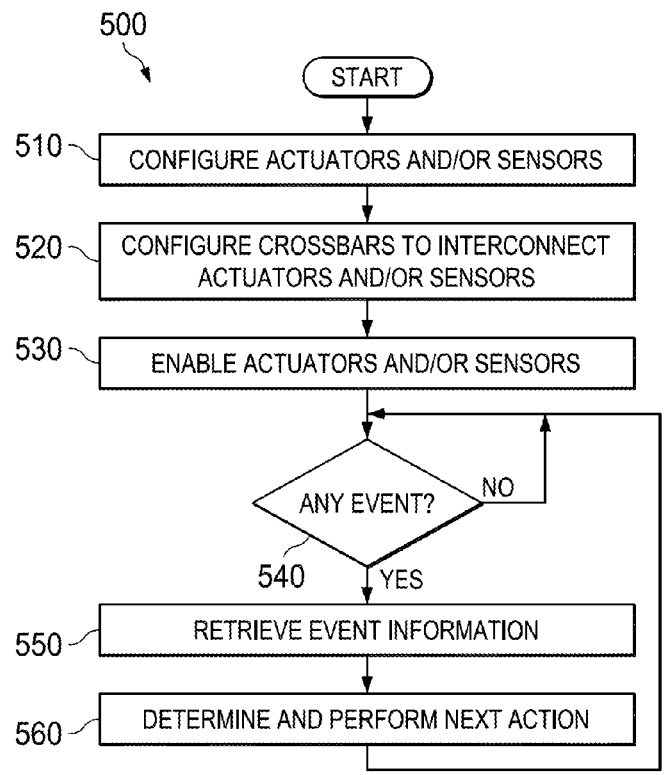
FIG. 5 shows a flowchart of a method for controlling an asymmetric processing cluster in accordance with various embodiments.

FIG. 5 shows a flowchart of a method 500 for controlling a signal processing cluster (e.g. asymmetric processing cluster 300 or 410) in accordance with various embodiments. Method 500 may be implemented at a PSM, such as 340. Method 500 may begin with configuring actuators (e.g. actuators 310) and/or sensors (e.g. sensors 320) for a set of pre-determined signal processing functions to implement a selected wireless communication protocol at step 510. At step 520, method 500 may configure programmable crossbars (e.g. programmable crossbars 330) to interconnect the actuators and/or the sensors to implement the set of pre-determined signal processing functions for the selected wireless communication protocol. At step 530, method 500 may enable the actuators and/or the sensors to start processing. At step 540, method 500 may wait for an event from one or more of the actuators and/or sensors. If an event is received, method 500 may proceed to step 550. At step 550, method 500 may retrieve the event and/or information from the corresponding actuator and/or sensor. At step 560, method 500 may determine some actions and/or controls (e.g. adjusting some thresholds, adjusting some configuration parameters, start, stop) on some of the actuators and/or sensors based on the received event and/or information. Subsequently, method 500 may return to step 540 and repeat the loop of steps 540 to 560. It should be noted that method 500 may be performed according to the context (e.g. functional properties) of a processing cluster and may differ from one PSM to another PSM. In addition, step 530 may be deferred to a later time, for example, after occurrence of some events. In some embodiments, method 500 may configure the PSM to enter a lower power mode (e.g. via a sleep mode configuration register) during the event wait period of step 540 and the PSM may return to a normal power state upon an detecting the event at step 550.

Figure 6:
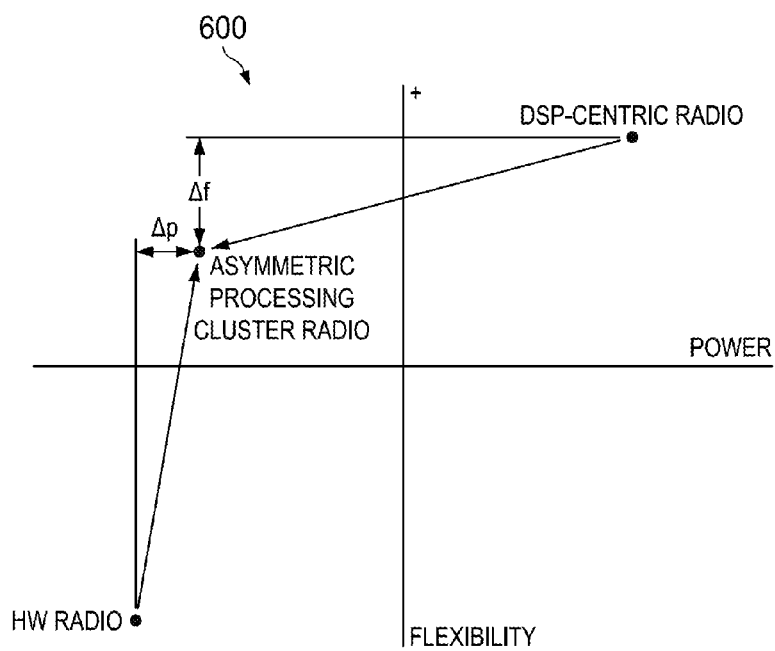
FIG. 6 shows a graph comparing power and flexibility of radio architectures in accordance with various embodiments.

FIG. 6 shows a graph 600 comparing power consumption and flexibility of radio architectures in accordance with various embodiments. In FIG. 6, the x-axis may represent power consumption and the y-axis may represent flexibility. A hardware (HW) radio (e.g. hardwired implementation) may consume low power, but may provide little flexibility. As such, a hardware radio may lie in the lower left quadrant of graph 600. Conversely, a DSP-centric radio may provide high flexibility, but at the expense of high power consumption. Thus, a DSP-centric radio may lie in the upper right quadrant of graph 600. The disclosed SDR with programmable asymmetric processing clusters controlled by distributed PSMs may be trading off some small amount of flexibility (e.g. indicated as $\Delta f$ in graph 600) when compared to a DSP-centric radio and yet maintaining substantially low power consumption (e.g. indicated as a difference of $\Delta p$ in graph 600) when compared to a hardware radio.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A communication apparatus, comprising:
   a plurality of signal processing units configured to perform a set of pre-determined signal processing functions according to a set of parameters;
   a plurality of programmable crossbars coupled to the plurality of signal processing units; and
   a plurality of control processors coupled to the plurality of programmable crossbars and configured to adjust the plurality of programmable crossbars to interconnect the signal processing units to implement a selected communication protocol,
   wherein at least one of the programmable crossbars routes data from a first of the plurality of signal processing units to a second of the plurality of signal processing units forming a data path without the data being received by the plurality of control processors.

2. The communication apparatus of claim 1, wherein the first signal processing unit is configured to:
   receive an input data stream via the programmable crossbars; and
   transform the input data stream according to one of the pre-determined signal processing functions.

3. The communication apparatus of claim 1, wherein the first signal processing unit is configured to:
   receive an input data stream via the programmable crossbars; and
   compute a scalar value from the input data stream according to one of the pre-determined signal processing functions.

4. The communication apparatus of claim 1, wherein the pre-determined signal processing functions are not modifiable, and wherein the set of parameters are modifiable.

5. The communication apparatus of claim 1, wherein the control processors are further configured to:
   configure the set of parameters for the signal processing units according to the selected communication protocol;
   enable the signal processing units;
   receive information from one or more of the signal processing units; and
   determine a next control operation according to the received information, wherein the next control operation comprises sending a control signal to one of the signal processing units.

6. The communication apparatus of claim 1, further comprising a program memory configured to store program instructions, wherein the program instructions are executed by at least one of the control processors to perform control operations for the selected communication protocol.

7. The communication apparatus of claim 6, wherein the program instructions are modifiable, and wherein at least one of the control processors executes the modified program instructions to perform control operations for a modified version of the selected communication protocol or a different communication protocol.

8. The communication apparatus of claim 1, wherein the signal processing units and the programmable crossbars are grouped into a plurality of processing clusters, wherein each processing cluster is controlled by a different control processor from the plurality of control processors, and wherein each cluster implements a distinct set of signal processing functions for the selected communication protocol.

9. The communication apparatus of claim 8, wherein the distinct set of signal processing functions comprises sample processing functions, symbol processing functions, bit processing functions, signal detection functions, or signal control functions.

10. A method for implementing a software defined radio (SDR), comprising:
selecting a plurality of signal processing units for implementing a first communication protocol, wherein each signal processing unit is configured to perform a pre-determined signal processing function according to a set of parameters;
configuring, via a control path, the parameters for the signal processing units to implement the first communication protocol;
configuring, via the control path, a plurality of programmable crossbars to transfer data without an intervening processor between at least two of the selected signal processing units for implementing the first communication protocol;
receiving, via a data path, an input data stream at a first of the selected signal processing units;
processing the input data stream at the first signal processing unit according to a corresponding pre-determined signal processing function; and
routing an output data from the first signal processing unit to a second of the selected signal processing units according to the configured programmable crossbars, wherein the control path and the data path are separated.

11. The method of claim 10, wherein the pre-determined signal processing function is a signal transformation function that transforms the input data stream, and wherein the output data comprises the transformed data stream.

12. The method of claim 10, wherein the pre-determined signal processing function is a signal summary function that summarizes the input data stream, and wherein the output data comprises a scalar value indicating the signal summary.

13. The method of claim 10, further comprising:
waiting for an event from the signal processing units; and
determining an action according to the event.

14. The method of claim 10, further comprising:
grouping the signal processing units and programmable crossbars into a plurality of processing clusters, wherein the signal processing units in each processing cluster implement a different set of signal processing functions for the first communication protocol; and
controlling each processing cluster separately to implement a corresponding set of signal processing functions for the first communication protocol.

15. The method of claim 10, further comprising:
selecting a second communication protocol;
adjusting the selection of the signal processing units for implementing the second communication protocol;
adjusting the parameters for the adjusted selection of signal processing units to implement the second communication protocol; and
adjusting the programmable crossbars to interconnect the adjusted selection of signal processing units for implementing the second communication protocol.

16. A communication apparatus capable of supporting multiple wireless communication protocols, comprising:
a digital sample interface coupled to a front end configured to receive and transmit radio signals wirelessly for communication;
a plurality of signal processing clusters, wherein each signal processing cluster is configured to perform a different set of pre-determined signal processing functions, and wherein each signal processing cluster comprises:
a plurality of signal processing units, wherein each signal processing unit is configured to perform one of the pre-determined signal processing functions;
a plurality of first programmable crossbars coupled to the signal processing units; and
a programmable state machine (PSM) coupled to the signal processing units and the programmable crossbars via a control path, wherein the PSM is configured to switch the interconnection of the first programmable crossbars to interconnect the signal processing units to establish a data path for implementing a first of the wireless communication protocols, wherein the data path is configured to transfer a data signal between at least two of the signal processing units without an intervening PSM.

17. The communication apparatus of claim 16, wherein each signal processing unit is configured to:
perform a pre-determined signal transformation function on an input data stream according to a first set of parameters; or
extract pre-determined signal information from the input data stream according to a second set of parameters, and wherein the PSM is further configured to configure the first set of parameters and the second set of parameters to implement the first wireless communication protocol.

18. The communication apparatus of claim 16, wherein the PSM is further configured to perform one task at one time.

19. The communication apparatus of claim 18, wherein the PSM is further configured to modify the task at a different time.

20. The communication apparatus of claim 18, wherein the PSM is further configured to:
transition from a first power state to a second power state upon completing the task; and
transition from the second power state to the first power state upon detecting an event, and wherein the PSM consumes a higher amount of power during the first power state than the second power state.

21. The communication apparatus of claim 16, further comprising a second PSM configured to control the plurality of signal processing clusters and the interconnection of a second plurality of programmable crossbars to implement the first wireless communication protocol.

22. The communication apparatus of claim 16, wherein the PSM is a reduced instruction set computing (RISC) control machine.

* * * * *